United States Patent
Schauffler

[15] 3,703,831
[45] Nov. 28, 1972

[54] FLEXURE BEARING WITH LOW ROTATIONAL RESTRAINT

[72] Inventor: David J. Schauffler, Orange, N.J.
[73] Assignee: The Bendix Corporation
[22] Filed: Dec. 2, 1969
[21] Appl. No.: 881,347

[52] U.S. Cl. ...........................74/5, 74/5.7, 308/2 A
[51] Int. Cl. ..........................................G01c 19/16
[58] Field of Search.....................308/2 A; 74/5, 5.7

[56] References Cited

UNITED STATES PATENTS

| | | |
|---|---|---|
| 3,211,011 | 10/1965 | Litty..................................74/5 |
| 3,264,880 | 8/1966 | Fischel ............................74/5 |
| 2,484,823 | 10/1949 | Hammond, Jr. ........308/2 A X |
| 2,517,612 | 8/1950 | Varian..........................74/5 X |
| 2,606,447 | 8/1952 | Boltinghouse....................74/5 |
| 2,735,731 | 2/1956 | Freebairn, Jr. et al.....308/2 A |
| 3,002,392 | 10/1961 | Scotto ..............................74/5 |
| 3,092,424 | 6/1963 | Tiplitz........................308/2 A |
| 3,307,411 | 3/1967 | Granquist.........................74/5 |

*Primary Examiner*—Manuel A. Antonakas
*Attorney*—Peter C. Van Der Sluys and Plante, Hartz, Smith and Thompson

[57] ABSTRACT

A bearing having flexure members for supporting an instrument and providing for limited rotation thereof. A plurality of spring members are arranged for exerting moments on the instrument the sum of which provides an anti-restraining moment to oppose a restraining moment exerted thereon by the flexure members. Each spring member includes means for adjusting the spring force exerted thereby to make the restraining and anti-restraining moments substantially equal even at zero rotation.

9 Claims, 7 Drawing Figures

INVENTOR.
DAVID J. SCHAUFFLER

AGENT

INVENTOR.
DAVID J. SCHAUFFLER

FLEXURE BEARING WITH LOW ROTATIONAL RESTRAINT

BACKGROUND OF THE INVENTION

1. Field of the Invention

This invention relates to flexure bearings and more particularly to such bearings having low rotational restraint.

2. Description of the Prior Art

Flexure bearings have proven useful for supporting precision instruments that require low friction bearings and limited rotation. The flexure bearings heretofore available used flexure joints or flex pivots which are friction free devices that allow for limited rotation in either direction from a neutral position. Rotation of the bearing was limited by the physical characteristics of the flex pivot and also by a restraining moment exerted thereby.

Boltinghouse, U.S. Pat. No. 2,606,447, provided a flexure bearing having little or no restraint. Spring members were used to provide an anti-restraining moment to oppose the restraining moment of the flex joint. The spring members were in compression and arranged for toggle or over-center action relative to the axis of the bearing as described in column 1, lines 39–40. The spring members exerted a zero moment on the supported device when in a neutral position but exerted an increasing anti-restraining moment as the device rotated from the neutral position.

Since the Boltinghouse bearing required overcenter or toggle action adjusting means were required to position the spring members so that the forces therefrom intersected the axis of the bearing as described in column 1, lines 48–51. Without such adjusting means there was a high probability that the spring forces would not intersect the bearing axis and that the springs would exert a moment on the supported device when the device was in the neutral position causing positioning errors. Means were also required to adjust the compression of the springs so that the anti-restraining moment and the restraining moment would be substantially equal.

Thus the prior art devices required means to adjust both the spring force and the spring position and in Boltinghouse this was accomplished by using three adjusting screws for each spring. The positioning adjustment means added considerable complexity to the bearing which increased the size and cost thereof. The prior art requirement that the spring act through the rotation axis of the bearing placed severe restrictions on design flexibility and essentially dictated the spring location.

SUMMARY OF THE INVENTION

The present invention contemplates a flexure bearing utilizing a flexure joint or flex pivot to support an instrument for limited rotation. The restraining moment normally associated with a flex pivot is opposed by an anti-restraining moment provided by a plurality of springs connected between the instrument and a stationary support.

The springs are arranged to exert forces along lines that are displaced from the rotation axis of the bearing so that the springs exert opposing moments about the axis. The sum of the moments provides an anti-restraining moment substantially equal in value to the restraining moment of the flex pivot. The anti-restraining moment is zero when the flex pivot is in the neutral position and increases as the device is rotated to oppose the increasing restraining moment.

Means are provided to adjust the spring force of each spring so that the anti-restraining moment provided thereby equals the restraining moment. The adjusting means are also used to assure a zero anti-restraining moment when the instrument is in a neutral position. The spring force of each spring is adjusted so that the sum of the moments is zero when the flex pivot is in the neutral position and the anti-restraining moment substantially equals the restraining moment when the flex pivot is rotated. Thus there is no need to adjust both spring force and position as was heretofore required.

One object of the present invention is to provide a flexure bearing having low rotational restraint.

Another object of the present invention is to provide a simplified means for adjusting the anti-restraining moment of a low rotational restraint flexure bearing.

Another object is to provide a low rotational restraint flexure bearing wherein a zero anti-restraining moment is provided in a neutral position by merely adjusting spring force.

Another object is to provide a low rotational restraint flexure bearing that has fewer design restrictions than those heretofore available.

The foregoing and other objects and advantages of the invention will appear more fully hereinafter from a consideration of the detailed description which follows, taken together with the accompanying drawings wherein several embodiments of the invention are illustrated by way of example.

DESCRIPTION OF THE INVENTION

Figure 1:
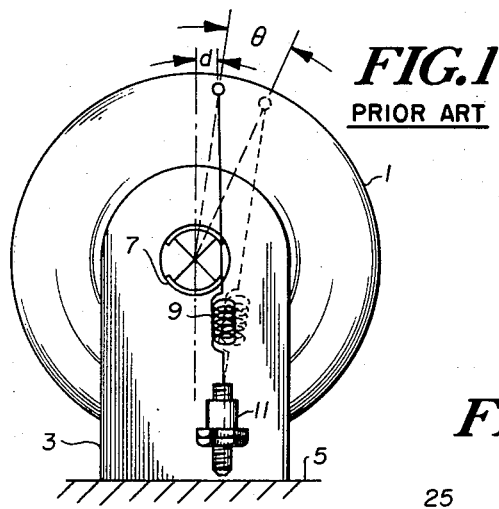
FIG. 1 is a side elevation view of a typical prior art device.

Referring to FIG. 1 there is shown a typical prior art bearing used to rotatably support an instrument 1, such as a gyro. A supporting member 3 is fixed to a reference object 5 and is connected to instrument 1 by a flex pivot 7 mounted therebetween. Flex pivot 7 supports instrument 1 and provides for limited rotation thereof about an axis through the flex pivot.

When instrument 1 is rotated about the axis the flex pivot exerts a restraining moment proportional to the angle of rotation from a neutral position. To overcome or neutralize the restraining moment a spring 9 is connected in tension between instrument 1 and supporting member 3 to provide an anti-restraining moment. An adjusting means 11 is provided for adjusting the spring tension so that the anti-restraining moment provided by the spring substantially equals the restraining moment of the flex pivot 7. Ideally the spring is aligned to act over the axis of the flex pivot to provide a zero anti-restraining moment when instrument 1 is not rotated and an increasing moment as the angle of rotation $\theta$ increases. For small angles of rotation the tension on the spring does not substantially change but the displacement of the spring from the axis of the flex pivot increases with rotation, resulting in an anti-restraining moment that increases with the angle of rotation.

In the drawing the spring is shown displaced from the axis by a distance d which represents errors permitted by manufacturing tolerances. The displacement of spring 9 causes a moment to be exerted on instrument 1, thereby rotating the instrument from the neutral position and causing an error. From the foregoing it is obvious that means are required to position the spring so that it acts through the axis when the instrument is in the neutral position. The prior art provided a complex means to accomplish spring positioning as previously explained.

Figure 2:
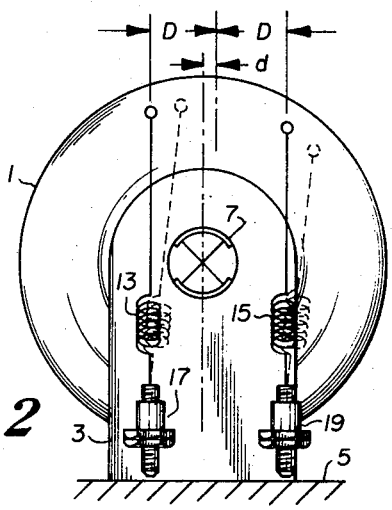
FIG. 2 is a side elevation view of a bearing constructed in accordance with the present invention.

Referring to FIG. 2 there is shown a bearing constructed in accordance with the present invention. Two springs 13 and 15 are mounted parallel to each other and are separated by a distance 2D, the median of the separation is displaced from the axis by a distance $d$ resulting from errors permitted by manufacturing tolerances. Each spring exerts a moment on the instrument and the moments are of opposite sense and oppose each other. The moments exerted by each spring are varied by spring tension adjusting means 17 and 19 mounted on supporting member 3.

In operation, the tensions of springs 13 and 15 are individually adjusted at zero rotation to eliminate errors caused by manufacturing tolerances in spring positioning. The instrument is then rotated and the spring tensions are equally adjusted until the anti-restraining moment equals the restraining moment. Instrument 1 is then free to rotate with only a low rotational restraint because the anti-restraining moment substantially equals and opposes the restraining moment of the flex pivot 7.

Figure 3:
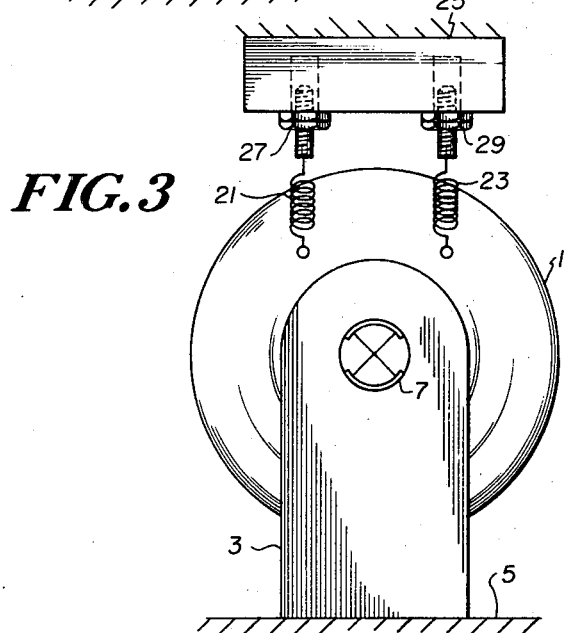
FIGS. 3, 4, and 5 are side elevation views of additional embodiments of the present invention.

Referring to FIG. 3 there is shown another embodiment of the invention having two springs 21 and 23 mounted in compression between instrument 1 and another reference object 25 having a fixed relation to object 5. This embodiment operates in a manner similar to the embodiment shown in FIG. 2, the compression of the springs is varied by adjusting means 27 and 29 to adjust the moment exerted by each spring so that a zero anti-restraining moment results when there is zero rotation of instrument 1 so that the anti-restraining moment equals the restraining moment when the instrument is rotating.

Figure 4:
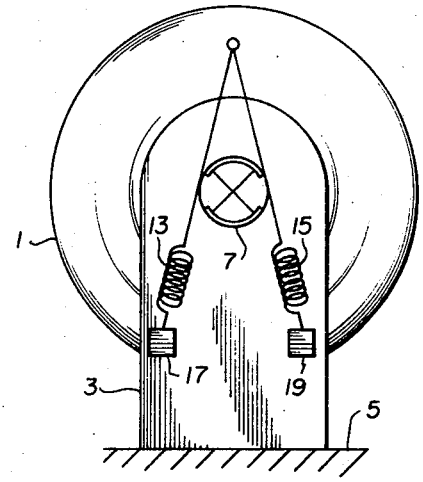
Figure 5:
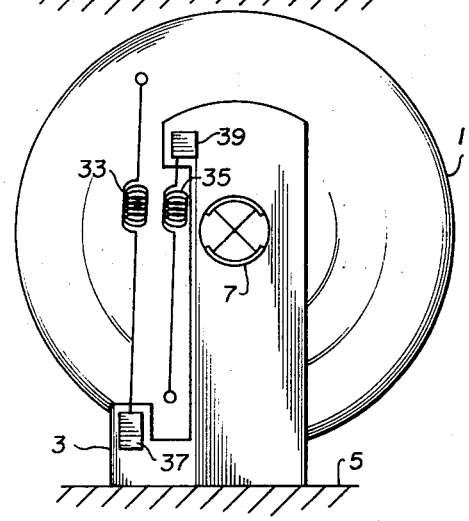

In FIGS. 4 and 5 there are shown other embodiments of the invention to illustrate the design flexibility afforded by the invention. The embodiment shown in FIG. 4 is similar to that of FIG. 2 in that springs 13 and 15 are mounted on opposite sides of the rotational axis. However, in the embodiment of FIG. 4, the springs are mounted so that they are spaced in angular relation to the axis. The moments exerted by each spring are likewise varied by spring tension adjusting means 17 and 19. In FIG. 5 there is shown an embodiment having springs 33 and 35 positioned on the same side of the rotation axis. Springs 33 and 35 are mounted in tension, the tension being adjusted by means 37 and 39 which operate in a manner similar to those in FIG. 2.

The springs are arranged to have stationary ends opposite from each other and fixed to support 3 so that the moments exerted thereby are opposing. The embodiments of FIGS. 4 and 5 clearly illustrates the flexibility of design provided by the present invention.

Figure 6:
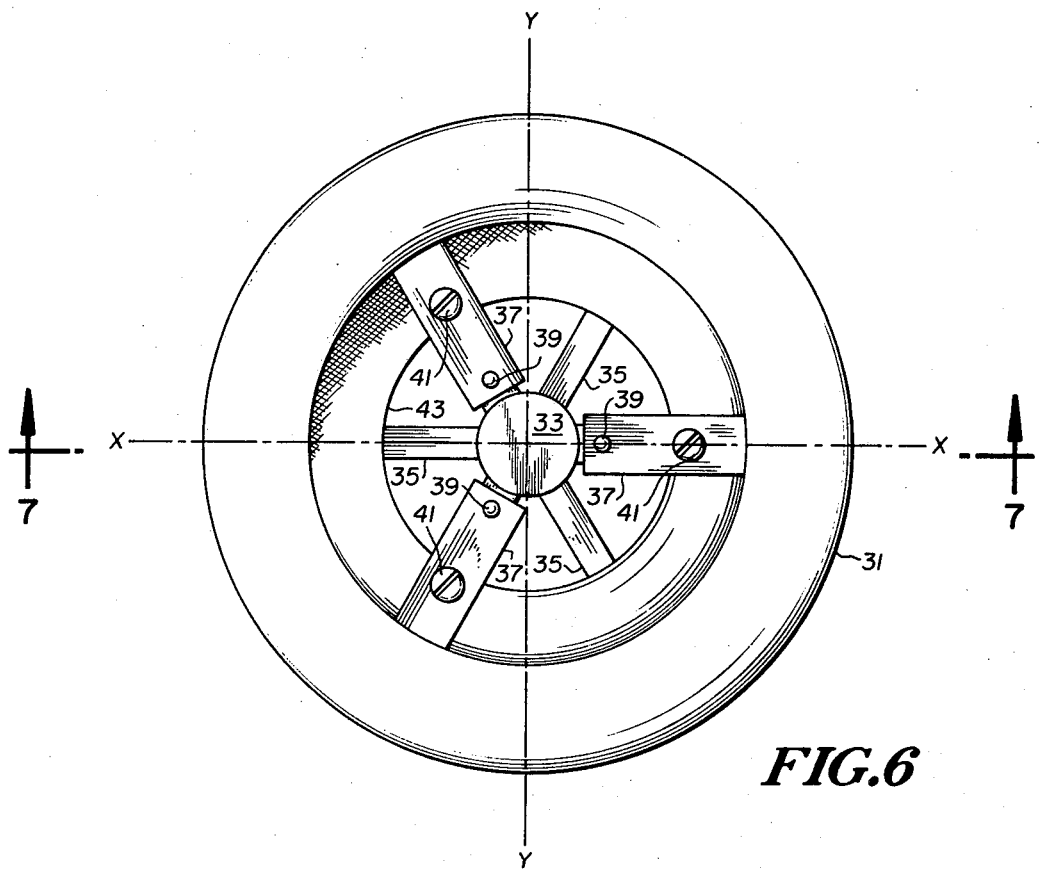
FIG. 6 is a plan view of a two degree of freedom gyroscope constructed in accordance with the present invention.
Figure 7:
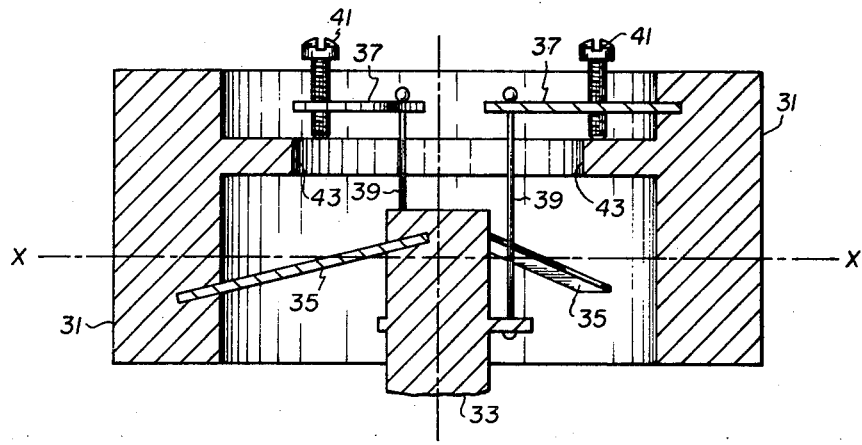
FIG. 7 is a sectional view of the gyroscope shown in FIG. 6 the view being taken along the lines 7—7.

Referring to FIGS. 6 and 7 there is shown a two degree of freedom gyro utilizing the concepts of the present invention. A rotating shaft 33 is connected to a gyro rotor 31 by flexure members 35 which support the rotor and provide for limited rotation of rotor 31 about axes X—X and Y—Y. Three spring member 37 each have one end embedded into an inner cylindrical wall of rotor 31 and are equally disposed about the circumference thereof. Connecting links 39 have one end fixed to shaft 33 and another end attached to spring members 37 so that the links are under tension. Spring members 37 exert moments about axes X—X and Y—Y through links 39 the sum of the moments about an axis equal zero when the rotor is not rotated about the axis. Rotation of the rotor about a rotation axis changes the distance from some of links 39 to the rotation axis so that the sum of moments about the axis changes to aid the displacement of the rotor and provide a anti-restraining moment to oppose a restraining moment exerted by flexure members 35. Machine screws 41 are threaded through spring members 37 to make contact with an inwardly extending flange 43 on the inner cylindrical wall of rotor 31. Screws 41 are provided for adjusting tension exerted by members 37 so that the anti-restraining moment substantially equals the restraining moment and the anti-restraining moment is zero when the rotor is not rotated about axis X—X or Y—Y.

Thus the present invention provides a flexure bearing wherein the restraining moment of the flexure moment is opposed by an adjustable anti-restraining moment so that the bearing has a low rotational restraint. The anti-restraining moment is adjusted by merely adjusting the spring force exerted by the spring members and it is not necessary to adjust the position of the spring members to obtain a zero anti-restraining moment when there is no rotation. The present invention provides greater flexibility in design than was heretofore available and the resulting bearing is less complex and costly than the devices of the prior art.

What is claimed is:

1. A flexure bearing having low rotational restraint, comprising:
   means for supporting a member for limited rotation, said means exerting a restraining moment when the member is rotated;
   means for exerting opposing moments on the member, the sum of the opposing moments providing an anti-restraining moment having a value substantially equal to the restraining moment but of opposite sense, so that the member rotates with little restraint, said means including a plurality of spring members connected between the supporting means and the member to exact spring forces on the member to develop the opposing moments and
   means for varying the opposing moments so that they exactly cancel each other when there is no rotation of the member and the anti-restraining moment is substantially equal in value to the restraining moment.

2. A bearing as described in claim 1, additionally comprising means for adjusting the spring force exerted by each spring member.

3. A bearing as described in claim 1, in which the supporting means comprises:
a fixed member.

4. A bearing as described in claim 3, in which the spring means comprises a torsion rod.

5. A bearing as described in claim 3, in which the spring means comprises a plurality of flexure members.

6. A bearing as described in claim 5, in which the flexure members form a flex pivot.

7. A bearing as described in claim 1, in which the member rotates about axes and the spring members are arranged to exert spring forces along lines displaced from the axes the displacement varying with rotation to vary the opposing moments so that the sum of the opposing moments increases with rotation.

8. A bearing as described in claim 7, additionally including means for adjusting the spring force of each spring member so that the moment provided thereby is variable and the sum of said moments nearly equals zero when the member is not rotated and substantially equals the restraining moment when the member is rotated.

9. A bearing as described in claim 1, in which the member rotates about two axes and the last mentioned means are arranged to develop opposing moments about each axis so that the sum of the opposing moments about each axis provides an anti-restraining moment substantially equal in value to the restraining moment about that axis.

* * * * *